United States Patent [19]
Marchant

[11] Patent Number: 5,792,959
[45] Date of Patent: Aug. 11, 1998

[54] PRESSURE DETECTION METHOD AND DEVICE

[75] Inventor: Brent R. Marchant, Knoxville, Tenn.

[73] Assignee: Autoliv ASP, Inc., Ogden, Utah

[21] Appl. No.: 643,668

[22] Filed: May 6, 1996

[51] Int. Cl.$^6$ .................... G01L 7/02; G01L 7/10
[52] U.S. Cl. .................................................. 73/730
[58] Field of Search .................... 73/705, 722, 728, 73/730, 52, 49.5; 250/231.19, 215

[56] References Cited

U.S. PATENT DOCUMENTS

| | | | |
|---|---|---|---|
| 3,100,997 | 8/1963 | Lorenz | 73/705 |
| 3,345,876 | 10/1967 | Smith | 116/266 |
| 3,492,968 | 2/1970 | Workman, Jr. | 116/270 |
| 3,503,267 | 3/1970 | Shiba et al. | 73/728 |
| 3,771,121 | 11/1973 | Lohr | 340/52 R |
| 3,818,764 | 6/1974 | Wagner | 73/393 |
| 3,944,769 | 3/1976 | Wagner | 200/83 A |
| 4,049,935 | 9/1977 | Gruber | 200/83 P |
| 4,276,776 | 7/1981 | Lapeyre | 73/705 |
| 4,394,033 | 7/1983 | Goetz et al. | 280/736 |
| 4,735,508 | 4/1988 | Bellio | 73/52 |
| 4,907,443 | 3/1990 | Pailler | 73/52 |
| 5,225,643 | 7/1993 | Marchant | 200/834 |
| 5,296,659 | 3/1994 | Potts et al. | 200/83 J |
| 5,351,527 | 10/1994 | Blackburn et al. | 73/52 |
| 5,356,176 | 10/1994 | Wells | 280/737 |
| 5,360,232 | 11/1994 | Lowe et al. | 280/741 |
| 5,429,387 | 7/1995 | Clark et al. | 280/737 |
| 5,440,932 | 8/1995 | Wareham | 73/730 |
| 5,474,328 | 12/1995 | Nilsson | 280/737 |
| 5,490,424 | 2/1996 | Shoji et al. | 73/728 |
| 5,496,062 | 3/1996 | Rink et al. | 280/737 |

Primary Examiner—William L. Oen

[57] ABSTRACT

A device and method for detecting pressure changes in a pressurized vessel, such as a gas storage bottle of an inflator of a vehicle restraint system. At least two reference marks are positioned on an outside surface of the vessel for indicating the pressure in the vessel. The marks are spaced apart on the surface by a predetermined distance. The predetermined distance can be measured at intervals, and correlated to determine changes in the pressure of the vessel. The references marks can be physical, i.e., paint or scratch marks, or magnetic, such as a magnetic bar or stripe. The physical marks can be read by an optical laser and the magnetic marks by a magnetic head, such as a floppy or hard disk drive, or a CD-ROM.

8 Claims, 1 Drawing Sheet

FIG. 1
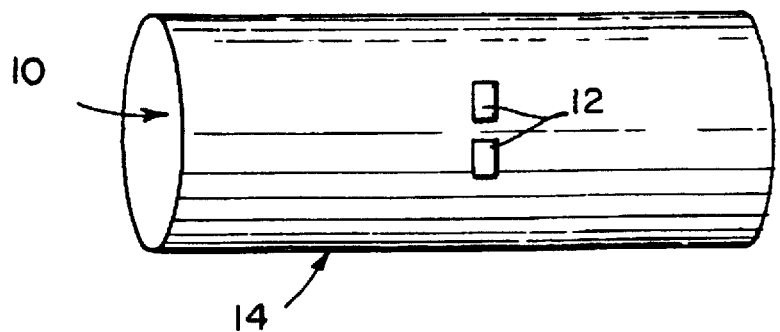
FIG. 4
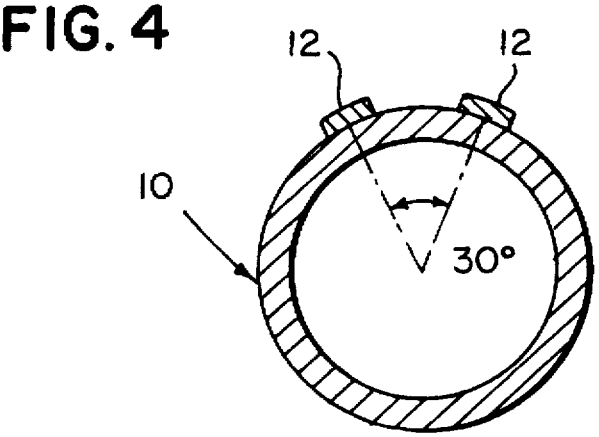
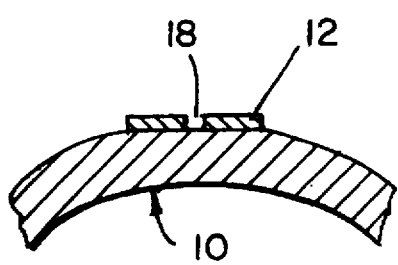
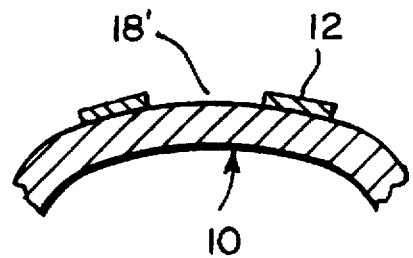
FIG. 2   FIG. 3

PRESSURE DETECTION METHOD AND DEVICE

This application is related to copending application Ser. No. 08/584,903, entitled "Wire-Wrap Pressure Sensor For Pressurized Gas Inflators", Ser. No 08/587,615, entitled "Post Deployment Fill Status Indicator", and Ser. No. 08/558,358, entitled "Temperature Adjusting Low Pressure Sensor.

BACKGROUND OF THE INVENTION

1. Field of the Invention

The present invention relates to a low pressure sensing device and method which utilizes optical or magnetic markings which can be read to determine the amount of gas within a pressurized vessel, and more particularly, to a low pressure sensing device for determining the pressure in an inflator of a vehicle safety restraint system.

2. Description of the Related Art

Numerous types of inflators have been disclosed in the prior art for expanding an inflatable air bag of a vehicle safety restraint system. One type of inflator, as disclosed in U.S. Pat. No. 5,301,979, assigned to the assignee of the present invention, utilizes a quantity of high pressure gas stored in a storage cylinder or body, which is selectively released to inflate the air bag. Another type of inflator derives the gas source from a combustible gas generating material, which, upon ignition, generates a quantity of hot gas for inflating the air bag. In still another type, the inflator includes both stored compressed gas and combustible gas generating material for inflating the air bag. Such an inflator is referred to as a hybrid inflator, an example of which is disclosed in U.S. Pat. No. 5,360,232, assigned to the assignee of the present invention.

In a vehicle safety restraint system which partly or solely utilizes stored compressed gas it is very important to monitor the pressurized bottle containing the stored gas to detect any leakage in the container. If the gas pressure of the bottle falls below a predetermined level due to an undetected gas leak, the airbag effectiveness would degrade and the system will not operate properly.

It is known to detect loss of pressure in a pressurized vessel, with such loss being attributed to a leak in the vessel or other damage to the vessel, see U.S. Pat. Nos. 3,771,121, 4,049,935 and 5,296,659. U.S. Pat. No. 5,225,643, assigned to the assignee of the present invention, discloses a differential pressure switch disposed within a pressurized vessel.

U.S. Pat. Nos. 3,818,764 and 3,944,769 disclose pressure sensors disposed within the vessel and which are temperature compensated by charging the sensor reference chambers with the same gas as the inflator. Thus, the switch must be pressurized and this pressurized gas may also leak. Moreover, continuous adjustment of the pressure is required.

U.S. Pat. No. 5,356,176 discloses a complex leakage detecting assembly which generates a signal in response to a change in temperature of the vessel through the use of a plurality of strain gauges and a layered bimetallic disk.

The above devices must be disposed within the vessel to monitor the pressure and temperature of the gas in the inflator. One disadvantage with such intrusive sensing devices is that an additional leak path is introduced in the vessel. Thus, high pressure insulative seals are needed through which the device is monitored.

Another disadvantage is the high cost associated with such devices. It is necessary to monitor the sensors with costly monitors, wiring and connectors located remotely in the vehicle.

SUMMARY OF THE INVENTION

An object of the present invention is to provide a lost cost, non-intrusive, low pressure sensing device, which does not produce an additional leak path in the vessel.

Another object of the invention is to provide a low pressure sensor which is simple to implement and easy to produce, thus keeping manufacturing costs low.

In accomplishing these and other objectives of the present invention, there is provided a device and method for detecting pressure changes in a gas storage bottle of an inflator of a vehicle restraint system. Means are disposed on an outside surface of the inflator for indicating the pressure in the vessel. The means are spaced apart on the surface by a predetermined distance. The predetermined distance can be measured at intervals, and correlated to determine changes in the pressure of the inflator.

The means for indicating can include at least two reference marks positioned in a spaced relationship on the outside surface of the inflator bottle. The references marks can be physical, i.e., paint or scratch marks, or magnetic, such as a magnetic bar or stripe. The physical marks can be read by an optical laser and the magnetic marks by a magnetic head, such as a floppy or hard disk drive, or a CD-ROM.

The present invention offers a low cost, easily applied, easily verified method of assuring pressure within a bottle of a gas inflator.

Other features and advantages of the present invention will become apparent from the following description of the invention which refers to the accompanying drawings.

BRIEF DESCRIPTION OF THE DRAWINGS

FIG. 1 is a perspective of a pressurized vessel, such as a gas inflator, including the non-intrusive pressure sensing markings according to the present invention.

FIG. 2 is a partial cross-section of an un-pressurized gas inflator with the pressure sensing markings according to the present invention.

FIG. 3 is a partial cross-section of a pressurized gas inflator with the pressure sensing markings according to the present invention.

FIG. 4 is a cross-section of hybrid gas inflator with the pressure sensing markings separated by a predetermined reference angle.

DETAILED DESCRIPTION OF THE PREFERRED EMBODIMENTS

A cylindrical pressure vessel inherently grows and shrinks as its internal pressure changes. As disclosed by the present invention, this movement can be utilized to determine whether the pressure in the bottle is sufficient by correlating the growth of the diameter of the cylinder with the internal pressure.

The present invention is a non-intrusive low pressure sensing device which can be used to monitor the pressure of gas in an inflator. Referring to FIG. 1, a gas storage bottle of an inflator 10 is filled and pressurized with an inert gas, such as argon or nitrogen, to a pressure typically in the range of 2000 to 4000 psi. It should be appreciated that the bottle can be one used in a hybrid, fluid fueled, or a cold gas inflator.

Gas storage bottle 10 is made of a flexible material, such as steel, which expands and contracts elastically in the pressure range for which it was designed. The bottle can have a wall thickness in the range of, for example, 0.080 in. to 0.120 in.

Bottle 10 includes, on an outer surface 14, at least two or more reference points or markings 12. The markings 12 can be made by any discernible mark, such as a physical marking, for example, scratches or paint marks, which can be optically discerned, as well as magnetic marks which can be read by a magnetic head. It should be appreciated that the marks can be established and measured at a pressurized or unpressurized condition of the inflator. Thus, either no gap or only a predetermined distance 18 is present between markings 12.

Referring to FIGS. 2–3, the method for determining the pressure within a pressurized vessel will be described. Initially, as shown in FIG. 2, chamber 13 of bottle 10 is in an empty, non-pressurized state. A small distance 18 is present between the marks 12, this predetermined distance 18 is recorded. Next, as shown in FIG. 3, the bottle 10 is filled to a known pressure, and temperature, and a distance 18' between marks 12a and 12b is recorded.

At a later date, the distance between the reference marks is measured, temperature is recorded and the current pressure is calculated.

EXAMPLE

A bottle of a hybrid inflator has a filled pressure of approximately 3000 psi., while its diameter is 2.376 inches. The bottle is filled, the reference marks made on the outside surface of the bottle, and the distance therebetween recorded. If the bottle was to be completely empty, the circumferential shrinkage of the bottle could be calculated as follows:

$$\sigma_{hoop} = \epsilon_{hoop} E$$

$$\epsilon_{hoop} = \sigma_{hoop}/E$$

Where $\sigma_{hoop}$ is the stress of a hoop, $\epsilon_{hoop}$ is the strain of the hoop and E the modulus of elasticity.

Since $\sigma_{hoop} = P \cdot r/t$ for thin walled cylinders, where P is the pressure within the vessel, r is the radius, and t the thickness of the wall;

$$\epsilon_{hoop} = P \cdot r/t \cdot E$$

For a hybrid passenger gas inflator: P=3000 psi; r=2.376/2; E=30 msi; t≅0.100 inches.

$$\epsilon_{hoop} = (3000 \text{ psi})(1.188 \text{ in})/(30 \text{ msi})(0.100 \text{ in})$$

$$\epsilon_{hoop} = 0.001188$$

So, over a 30° arc (0.524 radians) of the inflator, as shown in FIG. 4, the deformation can be calculated as:

$$s = r\theta$$

$$s = (1.188 \text{ in})(0.524 \text{ radians})$$

$$s = 0.622 \text{ in.}$$

The distance that the bottle would shrink over the 30° arc from full depressurization is:

$$\epsilon \cdot s = \delta_s$$

where $$\delta_s = 0.000739 \text{ in.}$$

The intermediate $\delta_s$ that would occur between full pressure and an empty bottle would be a linear extrapolation.

Hence, the need for accuracy in marking the reference points and reading the distance between the marks is necessary. Since the baseline distance was measured and recorded previously, the pressure inside the bottle can be verified by measuring the $\delta_s$ from the baseline state. For example, if the marks were established at the pressurized state, and the bottle was to lose pressure, the $\delta_s$ would be negative and a $|\delta_s|$ of a value grater than a predetermined number would indicate an unacceptable bottle pressure.

As described above, the reference marks can be a physical marking, such as a scratch, paint or other equivalent means, which can be read by an optical laser. The reference marks can also a magnetic printed stripe or mark, which can be read by a magnetic head of the type commonly used in the floppy disc and hard drive or CD-ROM technologies.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for detecting the pressure changes of a pressurized vessel, comprising:

means disposed on an outside surface of the pressurized vessel for indicating the pressure in the vessel, said means comprising at least two reference marks spaced apart on the surface by a predetermined distance; and wherein said predetermined distance can be measured at intervals, and correlated to determine the pressure of the vessel.

2. The device of claim 1, wherein the at least two reference marks are physical markings which can be optically monitored.

3. The device of claim 1, wherein the at least two reference marks are magnetic and the magnetic marks can be monitored by a magnetic head.

4. A device for detecting pressure changes in a gas storage bottle of an inflator of a vehicle restraint system, comprising:

means disposed on an outside surface of the inflator for indicating the pressure in the bottle said means comprising at least two reference marks spaced apart on the surface of the bottle by a predetermined distance; and means for measuring any changes in said predetermined distance, wherein said predetermined distance can be measured at intervals, and any changes in said predetermined distance correlated to determine the pressure of the inflator.

5. A method for detecting pressure changes in a pressurized vessel, comprising the steps of:

positioning at least two indicating means on an outside surface of the vessel;

filling the vessel with a pressurized gas, wherein as said vessel is pressurized said at least two indicating means are separated by a predetermined distance;

measuring the predetermined distance;

recording an initial pressure and temperature of the vessel;

monitoring the vessel at intervals;

measuring any changes in the predetermined distance separating the at least two indicating means; and correlating any measured changes in the predetermined distance separating the at least two indicating means, to determine an existing pressure in the vessel.

6. The method of claim 5, wherein the at least two indicating means comprise physical marks disposed on the outside surface of the vessel, and the step of measuring any changes in the distance separating the marks comprises determining the position of the marks with an optical reading device.

7. The method of claim 5, wherein the at least two indicating means comprise magnetic marks disposed on the outside surface of the vessel, and the step of measuring any changes in the distance separating the marks comprises determining the position of the marks with a magnetic head.

8. The method of claim 5, further comprising the step of comparing the initial pressure of the vessel with the existing pressure of the vessel to determine if any leakage of gas from the vessel has occurred.

* * * * *